(12) United States Patent
Coulson

(10) Patent No.: US 12,333,564 B2
(45) Date of Patent: Jun. 17, 2025

(54) FANADCLIC

(71) Applicant: John Lawrence Coulson, Pender Island (CA)

(72) Inventor: John Lawrence Coulson, Pender Island (CA)

( * ) Notice: Subject to any disclaimer, the term of this patent is extended or adjusted under 35 U.S.C. 154(b) by 0 days.

(21) Appl. No.: 17/729,424

(22) Filed: Apr. 26, 2022

(65) Prior Publication Data

US 2023/0342806 A1    Oct. 26, 2023

(51) Int. Cl.
| | | |
|---|---|---|
| *G06Q 30/00* | (2023.01) | |
| *G06Q 30/0226* | (2023.01) | |
| *G06Q 30/0241* | (2023.01) | |
| *G06Q 30/0242* | (2023.01) | |
| *G06Q 30/0251* | (2023.01) | |
| *G06Q 30/04* | (2012.01) | |
| *G06Q 30/0601* | (2023.01) | |

(52) U.S. Cl.
CPC ..... *G06Q 30/0226* (2013.01); *G06Q 30/0244* (2013.01); *G06Q 30/0262* (2013.01); *G06Q 30/0277* (2013.01); *G06Q 30/04* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 11,589,128 | B1 * | 2/2023 | Greiner | G06Q 30/0633 |
| 2002/0100042 | A1 * | 7/2002 | Khoo | H04N 21/44222 |
| | | | | 348/E7.071 |
| 2007/0083611 | A1 * | 4/2007 | Farago | H04L 67/53 |
| | | | | 709/217 |
| 2009/0144772 | A1 * | 6/2009 | Fink | G06Q 40/08 |
| | | | | 725/42 |
| 2010/0145796 | A1 * | 6/2010 | Berry | G06Q 30/06 |
| | | | | 715/767 |

(Continued)

OTHER PUBLICATIONS

Berger, Axel, et al. "Gamifies Interactions: Whether, When, and How Games Facilitate Self-Brand Connections." Journal of the Academy of Marketing Science, vol. 46, pp. 652-673, 2018. (Year: 2018).*

(Continued)

*Primary Examiner* — Luis A Brown

(57) ABSTRACT

Technology is described for enabling social and virtual interaction during online sessions while the user views or interacts with content infused with interactive advertising objects. (e.g., Product placement in a bait click styled environment.) The user interacts with interactive advertising objects to collect points for later redemption of goods, services, and sponsored prizes. The object of the process is that the user is never interrupted while going about moment-to-moment online activity and or watching a modified television network or cable broadcast of programming events, such but not limited to using a Search engine, watching a live or recorded sports or entertainment video, a music video, social media video and other online content. Alternatively, the system is complimentary to traditional advertising models and can be made to be interactive with and used with traditional television and interactive online media presentations of Sponsors brands and advertising messages.

1 Claim, 7 Drawing Sheets

(56) References Cited

U.S. PATENT DOCUMENTS

| | | | | |
|---|---|---|---|---|
| 2011/0137753 | A1* | 6/2011 | Moehrle | G06V 20/49 |
| | | | | 725/60 |
| 2012/0239469 | A1* | 9/2012 | Steinberg | G06Q 30/0241 |
| | | | | 705/26.1 |
| 2014/0259045 | A1* | 9/2014 | Sangal | G06Q 30/0275 |
| | | | | 725/23 |
| 2015/0296250 | A1* | 10/2015 | Casper | G06Q 30/0267 |
| | | | | 725/34 |
| 2015/0326925 | A1* | 11/2015 | Ozkan | H04N 21/458 |
| | | | | 725/36 |
| 2016/0027067 | A1* | 1/2016 | Zindler | H04N 21/4725 |
| | | | | 705/14.72 |
| 2019/0052925 | A1* | 2/2019 | McDowell | G06Q 30/0233 |
| 2019/0297390 | A1* | 9/2019 | Grusd | H04N 21/47202 |
| 2021/0329345 | A1* | 10/2021 | Quigley | H04N 21/47815 |

OTHER PUBLICATIONS

Ghosh, Tathagata, et al. "Brands in a Game or a Game for Brands? Comparing the Persuasive Effectiveness of In-Game Advertising and Advergames." Psychology Marketing, vol. 39, 2021. (Year: 2021).*

* cited by examiner

FANADCLIC

BACKGROUND

People watch online and television presented advertisements as a reward for the often and sometimes even paid entertainment style video and audio programming they interact with as they go about their daily lives. This traditional advertising model, since the dawn of television, has for many often been an invasive and even insulting way of interacting between Advertisers and the ever-watching public. In this day of technology this model has changed little and if anything, has become so intrusive as to attempt to shape and mold the lives and personal habits of billions.

Today you can watch myriad things online but often while engaged in watching your programming, and with no prior notice, as traditional television advertising does with sounds cues and the like, suddenly your programming is stopped for an advertisement, and more often than not, it is for a product or service that the mass majority of those being targeted have little or no interest in. e.g., Man watching a live football online at dinner gets served a steady stream of feminine hygiene product advertisements. Children watching movies get served a steady stream of advertising messages meant for a more adult audience. Women using a major search engine have the borders on either side of the page lined with Pornography advertisements and so on.

This new model creates a competitive, almost gaming like experience for the user that serves to better deliver direct targeted marketing of goods and services that pertain to a user's programmed likes, needs, wants, and dislikes. The artificial intelligence learning machine mechanism component will learn about each individual network user and will deliver advertising and related content to that specific user. e.g., Five persons all playing the same movie on different devices will all be delivered specifically targeted advertising meant especially for them to interact with. No two users will ever see identical advertising delivery content, and pushed content is also language, both written and spoken to a user's preference regardless of their geo-location at the moment of engaging the network.

Users interact with and collect sponsored virtual advertising tokens which are interactive and have a fluctuating value assessed to each. Once collected and stored in the users advertising token Cube, users are further encouraged to interactive with the individual advertising tokens that they have collected, and in return for their brand loyalty and watching additional sponsored content will often lead to accumulating more points and receiving additional special offerings, rewards, coupons, contest entries and the like. Traditional blanket advertising methods have very low conversion rate percentages with most in the low single digits. e.g., an internationally broadcast product sponsors advertisement message in North America may result in as few as 3-4 people viewing the advertisement for every 100 impressions. These small numbers suggest that 97 people out of 100 are oblivious to, or simply annoyed by the advertisement. Why?

Many of these messages are for products that not everyone buys or needs and often consumers just do not want, nor do they appreciate seeing them while shopping online or just surfing, gaming, watching movies and music videos and the like. Additionally, many of the advertisements are presented at inopportune times. Such as personal hygiene product advertising during meal times, or war game advertisements on Saturday mornings, or pornography ads directed at underage persons.

Bombardment advertising—the same advertisement message repeated several times in one presentation—often leads to high churn rate. While 3% of some very large number is potentially good, why anger the other 97% of users when you can cater to them one at a time on an individual basis as is proposed herein throughout?

Ultimately, high volume blanket advertising methods turn away more viewers than they gain, and this invention seeks to solve this problem for users globally.

SUMMARY

The technology is the game within the game that plays out like an interactive advertisement treasure hunt and is the polar opposite of obtrusive and invasive. During online interaction users are offered a series of preprogrammed virtual advertising objects tailored to their prescribed preferences that randomly appear and disappear during online activity and or while watching live or recorded television and on-demand and live streaming content. Popularly known as, but not limited to—TV Shows, Sports event, Music and Personal interest videos, Movies, Commercials, and the like. These advertising tokens are interactive, and users score redeemable points for interacting with and collecting advertising tokens. Sponsored advertisements are now of great value to users, and not a non-stop, never ending irritating intrusion of their privacy. This interactive advertising system will lead millions to winning Sponsors' products and services and cash rewards just for the fun and privilege of blowing up, shooting down, hovering over, and clicking on advertisements and randomly appearing product placements.

The technology is a cooperative, non-linear content add-on pack that promotes advertising tailored to a user's preferences—that is displayed to that specific user—although every other element is shared. e.g., network contracted sponsors advertising messages will bear different messages and be presented in different languages (both written and spoken) dependent upon a user's stated personal preferences.

DETAILED DESCRIPTION

Figure 1:
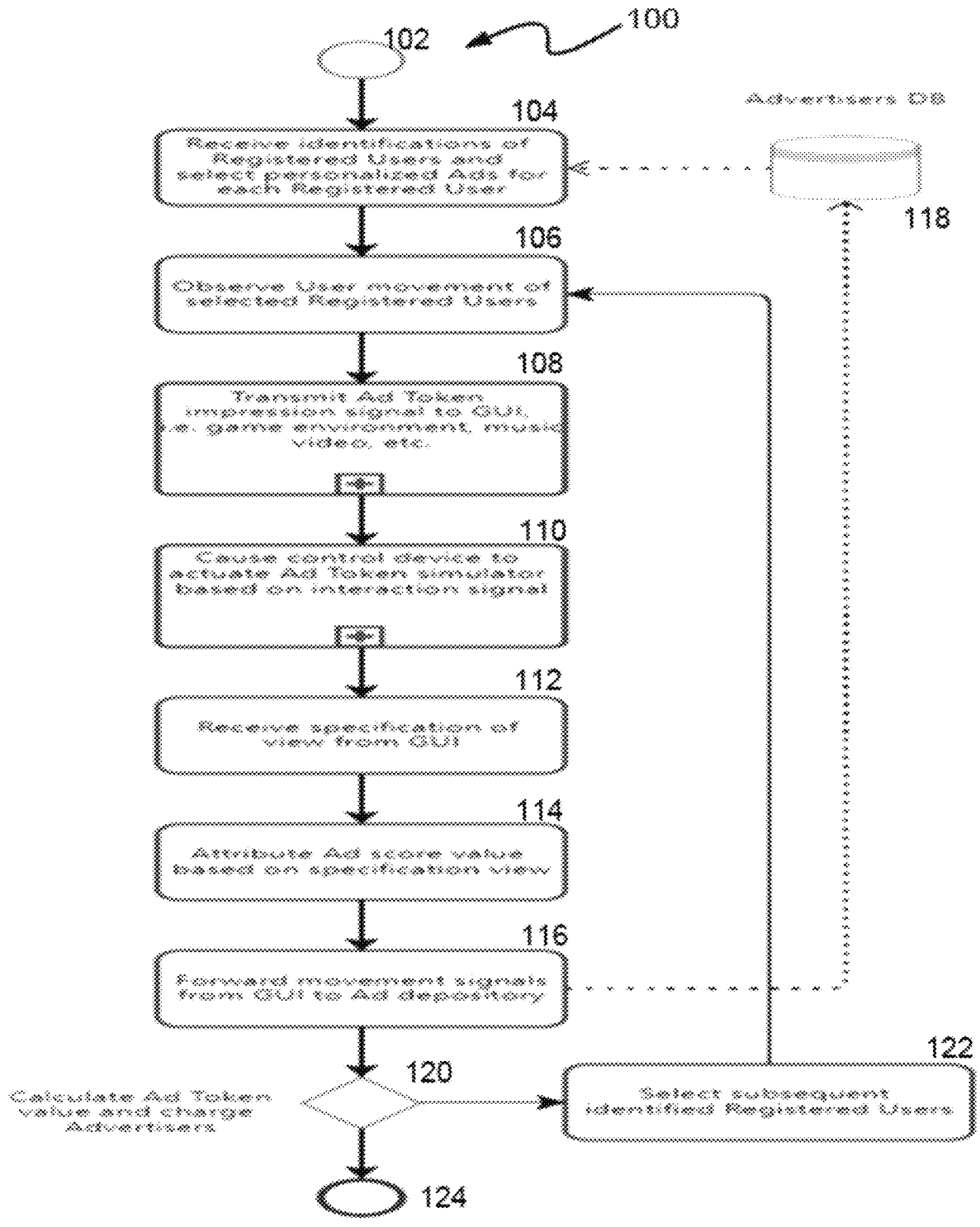
FIG. 1 depicts a Flow chart diagram that shows the advertiser's interface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is disclosed for enabling social interaction while participating in interactive online advertising ("the technology"). In various embodiments, the technology enables a user (e.g., a video game player, video watcher, sports fan, or passive user) to virtually interact with and collect randomly appearing sponsored advertising tokens. The technology can enable users, e.g., video game players who are playing multiplayer video games, or video watchers to interact with other interactive advertising content over a broad spectrum of formats and devices. Thus, the technology enables users to collect for possible profit, interactive randomly appearing advertising tokens and brand messages including sound cues.

In various embodiments, the technology can enable one or more users to participate and share, sell, donate, or gift, or trade collected advertising tokens using myriad technological internet enabled and broadcast television enabled devices. e.g., by viewing output on a television or mobile smart phone or personal computer projection screen and providing input via a controller to interact with and collect advertising tokens and related content one can share, sell, donate, or gift, or trade collected advertising tokens.

The technology collects advertising tokens and related content through input provided by a user to compute a score based on the number of advertisements and related content interacted with and or collected.

The technology may then award points based on how a user's inputs are related to how many times the advertising tokens and related content are collected.

The technology can also enable the user to observe full length advertising messages at a time of their own personal choosing. e.g., the technology may be used in a car racing game or live or recorded broadcast event. In this example, one or more inputs of clicking on, hovering over, virtually shooting
at, and the like of randomly highlighted brands on a race car in motion will result in opportunities for the user to collect active advertising tokens with no direct interruption of the users viewing and or playing experience.

In various embodiments, a user may sign up to participate online and become an Opt-in to Cash in network member.

In various embodiments, a user may sign up to participate online and become a Opt-out to Cash in network member.

In various embodiments the user may select from a pool of sponsors the types of advertising messaging they wish to have interjected into their personal viewing content and choose to discard the types of content they do not want to be delivered to them while enjoying their online or broadcast television experience. e.g., the user may select advertising messages from one network sponsor and choose to not be delivered content from another. As a further example, the user may select specific advertising messages from one network sponsor and choose to not be delivered other messages from the same sponsor.

The technology may also adjust the accumulated points, or scores based on number of inputs (collected advertising tokens and related content). e.g., if the users' inputs are above calculated network averages, additional points may be awarded. e.g., if the users' inputs are below calculated network averages, the system will send them encouraging messages enabling them to collect additional points and awards.

In various embodiments, the technology may enable users using various computing devices (e.g., full motion simulators, personal computing devices, tablet computing devices, handheld computing devices, gaming consoles, and the like) to participate, and may adjust collected and earned scores to account for the different devices. e.g., a video game player using a handheld computing device may be disadvantaged by not being able to fully view advertising tokens and related content inputs because that user cannot anticipate upcoming changes in road conditions or course layouts as well as a player using a full motion simulator and projection system.

In various embodiments, the technology may enable users to collect, trade, buy and sell, donate, or gift a proprietary based crypto currency as issued by the network system to its registered members.

In various embodiments, the technology may enable users to interact with enhanced, interactive graphic user interface menus as supplied for by the sponsors. In example—The menu a user sees while watching myriad sports events. Interact with these menus as prescribed herein and collect advertising tokens and related content.

In various embodiments, the technology may enable users to interact with the system while fully immersed in a video game or watching a movie or music video without the need to pause or rewind the experience. The interface is designed to become one with the environment it is being interacted with. e.g., you and your online friends get hungry during the multi-player online gaming session you are immersed in together—simply bring up the interactive menu, order food, services, merchandise and more for delivery and score even more points. The gaming session continues with no interruptions required.

In various embodiments, during the online or televised broadcast live, recorded or on-demand event, the technology can collect and broadcast inputs from users in nearly real time. e.g., a device proximate to the user can collect inputs from the local environment, sights, sounds, vibrations, and the like, e.g., from various sensors, video and still photography cameras, scanners, sound recorders and the like, and use these devices to adjust personalized delivery of advertising and related content.

In various embodiments, spectators viewing the users' event—whether live or remotely—may also employ aspects of the technology without being directly immersed into the user's experience. In example—as while playing a multi-player video game those who are passively watching as Fans of the event may also interact with randomly appearing advertising tokens and related content without being involved in the game or interrupting anyone who is playing. e.g., spectators may select various camera angles, receive vibration simulations, or sound cues etc., to alert of them an upcoming pending advertising token collection event. The user may then interact with some or all aspects even while seated as a spectator at a live event while using their device to follow along and interact with the event on site.

In various embodiments, the technology may enable users to interact with other network members, both those who have Opted-in to Cash in and those who have Opted-out. In this manner they can communicate through a networked social media style environment to buy, sell, trade, donate or gift their advertising tokens, proprietary crypto currency, credits earned, coupons, and all other related content they have earned through network participation.

In various embodiments, the technology acts as the "game within the game". It plays out like an interactive advertisement treasure hunt and is the polar opposite of obtrusive and invasive. During game play gamers are offered a series of preprogrammed advertisement objects that randomly appear and disappear. These digital advertising tokens are interactive, and users score points for collecting them. Sponsored advertisements are now of great value to users, and not an irritating intrusion and interruption of their current activity and will lead millions to winning sponsors' products and services and cash rewards just for the fun and privilege of viewing and interacting with sponsored advertising messages.

In various embodiments through an array of sponsored advertising tokens, network contracted sponsors will pay for each impression within a threshold of advertising tokens collected by a given user. Tis fee structure is established between the network and the advertising sponsor on a per advertisement basis. e.g., like pieces of a puzzle, a user may see one or more almost identical advertisement impressions during an entertainment session. This way sponsors/contracted advertisers can populate the content with multiple hidden and non-hidden advertisement objects. e.g., as the user blows up a virus and it sheds 120 spikes, each single spike is assigned to a licensed brand. The user is now drawn to these multiple high value targets and enticed to capture them. No user will get them all in the first pass, and only a limited number of these advertising tokens hold a higher value than their almost identical counterparts, but which one? Users will have to try and collect them all to find out which ones are of value, and which are not.

In some embodiments multiple sponsors can be placed inside of a single interactive object with some, as stated, being of more value to some users than others.

In various embodiments the product placement advertising tokens may also contain micro advertising. e.g., a vendor who is targeting gamers in a specific region of the globe is on a restricted advertising budget. This sponsor may reach an agreement with a global advertiser in that the global advertiser will strategically place the local advertisers brand image or message within the content of their own advertising message. This serves to improve the message for both the global sponsor and local sponsor while reducing the costs normally associated with running one's own global advertising campaign.

In various embodiments this system has all the standard online advertising features such as impression tracking, real-time advertisement scheduling (insertion) and reporting, processing software and billing features, including but not limited to an auto-pay, auto/instant rewards system for users, and of course real-time advertisement placement technology tailored to each user's registered preferences.

In various embodiments additional value and impact are provided by direct targeted marketing to users in the language (spoken and written) of their choice. e.g., imagine five players, each originating from different locations on the planet, are in Los Angeles playing the game as a MMOG-style eSports event. Relevant to the information they provided when they first signed up each user experiences the same playing field but in each field the advertisements and notifications are not only delivered in their own language but also, each of the five would likely be viewing a different advertisement drawn in real-time from the networks contracted sponsors advertisement pool and displayed in the written language of their choice and heard in the vocal language of their choice. e.g., Hindi, French, English, German, Italian, and the like.

In various embodiments the technology utilizes licensed celebrity guest stars as both live guests and/or programmed in-content character objects that make scripted commentary during the online and or television broadcast experience. e.g., Celebrity figures will make ongoing live appearances, (masked with filters or as themselves) or as ongoing programmed roles in the form of their programmed Avatars. In these instances, celebrity appearances, live and/or virtual, can also be disguised to be portrayed into content as interactive advertising mechanisms and collectible advertising tokens. Users can shoot, click on, run over, hover and the like over a celebrity character, and much like any advertising token, or game object to be collected, it will "blow up real good" and from inside will emerge more interactive advertising tokens to be collected.

In various embodiments the technology also features an interactive food, beverage and merchandise ordering, delivery, and payment system. The automated intelligent system is connected in the online environment and is managed through an artificial intelligence machine learning component graphic user interface display that interconnects all users who open accounts on this system. e.g., the auto ordering system works in the following manner but is not limited to doing so: during game play and while still playing users can call up the graphic user interface e-commerce component to interact with an intuitive interactive ordering system. During game play and set on an auto timer function, the artificial intelligence machine learning component that drives the ordering system will present a graphic user interface display to enable users to order goods and services.

In various embodiments, when the food and beverage portion of the ordering system is summoned, the artificial intelligence machine learning component chooses from a pool of advertising sponsors advertisements who are located within the delivery zone of the user. This dynamically created list might include but is not limited to local services for takeout food, and/or for liquor/beer/wine and junk food delivery, and the like.

In various embodiments the artificial intelligence machine learning component driven ordering system may appear, but not be limited to appearing, as an interactive menu board whereby users might shoot lasers at the menu items to expose their prices and trigger an ordering, pricing, and more information function. e.g., this action might also expose hidden advertising tokens that a user can attempt to collect as they interact with a sponsor's menu.

In various embodiments, the artificial intelligence machine learning component driven ordering system also comprises of an online payment system linked to a user's credit account. e.g., in this manner users can continue game play, watching movies, shopping and the like while ordering take out delivery services from local vendors and be automatically debited through a secure payment system.

In various embodiments, the technology is also directly tied to online stores featuring drop shipping, such as those hosted by Shopify. Collect enough advertising tokens and cash them out in the networks online store or a partner's online store stocked with sponsors' products and services.

In various embodiments, the technology as an online App is a downloadable app for mobile (Android, iOS), PC, smart devices, consoles, and the like that turns any website or web content into an interactive advertising medium. e.g., when users visit a website and view advertising they can interact with it, allowing them to collect advertising tokens just as they do during game play and other related viewing and interactive activities.

In various embodiments, the technology can be applied to all first-person shooter (FPS) style games, other games and myriad online media that have interactive objects that can be collected by being destroyed/shot at/run over/clicked on/hovered over and the like, as a way of accumulating points through general use of a computer ecommerce software system, video presentation or static display.

In various embodiments, the technology is a new form of Clickbait advertising content placement which enhances, rather than detracts from a user's online or television broadcast experience. e.g., as in game play, internet surfing, watching movies and perusing innumerable websites for ecommerce and or entertainment opportunities.

In various embodiments, the technology is an advertising program that delivers scalable real-time sponsored content to any user regardless of geographical location or language.

In various embodiments, the technology enables users to hover over, click on, shoot down, run over, smash into, and the like to otherwise interact with sponsors' advertising links as they subtly and almost imperceptibly appear and disappear randomly during any online session.

In various embodiments, the technology used during a user's online experience only presents advertising based on each individual user's likes, dislikes, wants and needs as defined by the user during the registration process. e.g., these personalized and programmed choices are complemented by the artificial intelligence machine learning component that learns a user's habits and automatically adjusts targeted advertising content for delivery to their devices.

In various embodiments, the technology enables users to instantly win and/or be assigned prize awards in the form of coupons or credits, and the like that can be printed or redeemed online for merchandise and services such as those provided by potential sponsors.

In various embodiments, the technologies Code is written so that the online gate (User Fees) will be proportionally and instantly paid to all parties in the payment chain, e.g., to reduce paperwork and decrease year-end accounting practises expenses.

In various embodiments, the technology will enable registered users to have the option to establish a personal encrypted online account with the network. e.g., users can then trade, or sell for cash, donate or gift the bitcoins or credits, and the prizes they earn and win.

In various embodiments, the interactive advertising tokens linked to games and other online media environments directly target interactive advertising content for delivery to users, e.g., this content may also include, but not be limited to e-maps, local businesses, restaurants and delivery services, coupons (printable and e-coupons), and other pertinent information such as content delivered in preferred languages, written, and/or spoken regardless of a users geo-location at the time of engaging the network.

In various embodiments, the technology can be integrated into educational content for both children and adults. e.g., to make their online experience more fun, educational, and potentially profitable.

In various embodiments, the technology enables sponsors to deliver myriad branded content in a variety of ways at a density threshold well above what which would normally be tolerated as acceptable by the average consumer. e.g., by not disrupting the user experience and complimenting the user experience with non-obtrusive advertisements that are interactive and have a perceived value it is surmised users will accept more advertisements placed in their content then would be normally deemed as acceptable if the advertisements were to stop or otherwise interrupt a user's activity.

In various embodiments, the technology provides complementary revenue streams for any game and myriad online content through advertising and sponsor agreements and interactive food, beverage, and merchandise ordering, delivery, and auto payment and debit services, and onsite drop shipping of sponsored products.

In various embodiments, the technology direct targeted marketing of product placements through online game and website content manipulation benefits both advertisers and consumers. e.g., at the end of the game or simulcast presentation, online players and simulcast participants can access a database of local, regional, national, and international advertisers and download coupons and related promotional information to their network enabled computer devices.

In various embodiments, the technology codes can be written to encourage sales through coupon giveaway promotions. e.g., these coupons can be made time sensitive and coded for use by manufactures and suppliers to help them in their marketing and product sales tracking efforts.

In various embodiments, the technology can be written so that when a user is simply playing a game, shopping, watching a movie and the like, when they interact with a sponsored advertising token as they appear to download the advertising to their network enabled computer device. e.g., at the user's convenience they can simply then show up at a sponsor's brick and mortar location or visit their online store where the sponsors computers will accept the user's virtual or replicated coupon or related promotional material for redeeming.

In various embodiments, should a user decide to pause, rewind, or fast forward and while instant replays are shown, direct targeted marketing in the manner proposed herein also allows the user to interact with live online and or televised network broadcasting during the time they are engaged in content. e.g., in this manner live action is never interrupted for commercial advertising. As a player, driver, diver, golfer, surfer, water skier, jet skier, snow skier, snow boarder, batter, pitcher, catcher, fielder, defenseman, quarterback, running back, safety and the like is involved in a replay situation, the online user has the opportunity to hover over the scene to expose targeted pop-up advertisements local to the user and related to the types of goods and services they are interested in. e.g., these advertisements are embedded into the coding for live players and persons, live and virtual scenes and scenery, virtual characters, masking filters, avatars, web content, game characters, and the like.

In various embodiments, the technology enables the myriad games and other content to employ the use of a commentator or MC-type character, living or virtual. e.g., this person's voice can be manipulated to deliver advertising messages through specialized speech programming throughout the course of the game as for Pro hockey; the online virtual commentator pipes up after your wicked slap shot from the blue line; "What a sizzling slap shot ladies and gentlemen! It practically blew the Tacks off the goalie!" This commentary using the sound cue "Tacks" triggers the goalie's skates to light up momentarily enabling a potential collection event. As a further example, the commentator delivers another commercial message in the broadcast, "Mmmm, speaking of sizzling, Sizzles is cooking tonight," and if the user clicks on the goalie's skates before the advertisement fades out of sight, users can access coupons for discounts or for free food items at Sizzles, and so forth.

In various embodiments, the technologies viewing mechanism encourages users to focus on all aspects of the viewing plane. e.g., traditionally users tend to focus on the middle of the viewing surface, and mainly because that is where the content of the subject matter is placed by Developers, however, such as on news feeds or popular Search engine websites there is often unrelated content placed in the margins to the right, left, top and bottom of the main content. This holds true also for gaming, movies, music videos and the like.

In various embodiments, the technology can be used to enhance traditional online, print, and television broadcast adverting models. e.g., micro ads can be made to appear during a 10-15-30 second or longer advertising message such as those which are considered commonplace on network and cable broadcast television today and also as used by some video on-demand and other dynamic and static content suppliers.

In various embodiments, the technology incorporates instant rewards and messaging in a shared advertising micro advertisement placement environment that pools together an international database of regional and local advertisers whose collective buying power enables them to compete regionally on our network with larger well-established corporations. e.g., an international-based advertiser database compiled of local merchants offers central server control for the delivering of direct-to-consumer individualized, targeted advertising messages and promotions. Regional or locally based advertisers pay only for those advertisements of theirs as they appear. Local or regional based advertising messages only appear when a person or persons are online and accessing the network and are within the boundaries of the advertisers' specified targeted marketing zones and/or delivery areas.

In various embodiments, the technology incorporates geographical-based advertising messages that are updated in real-time and appear current during each online session. e.g., while playing a version of SIM City the user now sees a giant TV screen in a home environment they've just created. Because they had previously filled out their online survey to indicate they like "American Idol" then as they play SIM City its in-game television screen would display an interactive static or dynamic commercial message reminding the user their favourite show is coming on at nine tonight—local time.

In various embodiments, the technology incorporates the overlaying or injecting of sponsors advertising messages with adjustable imagery into existing multi-media content like professional sports and others to deliver regional and neighbourhood specific advertising messages. e.g., this can be produced to appear in the event in many forms as with the technology be used to change logos on t-shirts and ball caps of simulated and real-time live characters and Fans sitting in the stands behind home plate during the World Series. This component of the technology can be used to change and to deliver any number of millions of potential direct targeted advertising messages. Gamers using an avatar that runs through a game environment might see their Nike's periodically light up. Click on them while lit and score points. During Tiger Woods golf, or a live simulcast broadcast of a pro golf match the logo on a Titleist, or Callaway golf ball might light up. Click on the glowing logo before it disappears to score additional points.

In various embodiments, the originating game, movie, or website content from a server streams the event out as a template. As the original stream enters the local internet service provider from the originating server it is split into the number of active users or viewer accounts on the network. e.g., in the case of this invention these streams are intercepted at the local internet service provider level, and at this level each registered account is assigned a personalized advertising package. These pre-tailored advertisement packs are then passed on to local users and other interactive viewers in the form of interactive advertising content injected into their viewable and playable content.

In various embodiments, interactive advertising display will be augmented by an artificial intelligence machine learning component and woven seamlessly into the experience as users engage online and or television broadcast content. e.g., these brief messages appear in the form of interactive game objects, icons, Avatars, masking filters, animated GIFs, etc., with their visual presence based on brands and characters of licensed advertisers and sponsors and are meant to enhance a user's experience—not detract from it.

In various embodiments, the system delivers scripted sponsored advertising in real-time, and changes advertisements on the fly according to recommendations made by the artificial intelligence machine learning component, based on user provided data and their online activities. These advertising messages are dynamic and/or static presentations of a sponsor's brand, logo, or game object character, and literally any interactive scripted object constructed and displayed on a computing system.

In various embodiments, hidden objects will feature, but not be limited to featuring 3D shapes based on a given sponsor's brand, logo, or character-based licenses and the like. e.g., this design enables multiple advertising brands to be seen by a user simultaneously. Over time, and as advertising messages change due to artificial intelligence machine learning component influence, the system will learn which advertising messages are best presented to a given user.

In various embodiments, the artificial intelligence machine learning component employs a modified screen saver mechanism. e.g., when a user's device is left unattended, instead of the systems automatic shutting off of the screen, an interactive screen save style display appears. e.g., this is a channel to push interactive advertising content specified to and controlled by a users input to the network identifying their personal likes, wants, needs, and dislikes. Users can program the screen saver function to deliver interactive messages and other personal content related to their programmed preferences.

In various embodiments, additional audio cues are included to trigger players to pay attention to a pending advertising token collection event. Timed for delivery, non-hidden advertising token objects also randomly appear or become superimposed/lit up momentarily after a sound cue triggered event.

In various embodiments, to collect and track these hidden and non-hidden advertising tokens, registered users who have established a personal social media account on our system, or a related gaming system, are issued what appears to resemble a bingo play card in the form of a multi-sided interactive cube object. e.g., instead of collecting bingo numbers for this card, users collect the advertising tokens that they have interacted with during their experience.

In various embodiments, collected advertising tokens from network sponsors are stored in the user's account and displayed for future interaction on their cube.

In various embodiments, the object of the technology is to find and collect as many advertising tokens as possible, like any good game, some collectable interactive objects will be rarer than others, thus harder to find and harder to capture.

In various embodiments, upon a user reaching a specified threshold, a collection cube prompts the system to automatically issue sponsored products and or services. e.g., a user collects several dozen interactive advertising tokens from Sponsor A, the system then automatically issues a sponsor's prizes and or cash awards. i.e., t-shirts, hats, coupons, clothing, trips, mugs, coupons, and the like from a related sponsor.

In various embodiments, network advertising tokens have an inherent value and can be bought, sold, traded, donated, or given between users.

In various embodiments, users who access these cached advertising tokens saved to their personalized advertisement collection cube after gaming, watching a movie or music video, general web surfing and the like, will find that if they further click on a sponsor's brand that they often contain secret surprises. e.g., when the user interacts with their collection cube via their online network account further discounts on merchandise, coupons, credits, instant prizes, and the like, serving to extend brand exposure and converting impressions to sales.

In various embodiments, each time a user captures an advertising token it is assigned a location on the collection cube. e.g., as users begin to collect interactive advertising tokens and related content, initially the corresponding location on the collection cube appears as a translucent brand image. As users collect more advertising tokens from a given sponsor, the assigned location on the collection cube begins to fill in. It might take as many as 100 (one hundred) or more captures on a single brand over many days or weeks of game play before a collection cube brand space turns from translucent (see-through) to opaque (solid).

In various embodiments, collected user information is also stored as analytics for future review by sponsors. e.g., For users who have registered using the networks "Opt-in to Cash" in function, sponsored advertising impressions are calculated each time a sponsor's brand advertising token is captured. Further impressions are calculated when and if users access their collection cube and begin to interact with the advertising tokens that they have previously collected over time. Sponsors will set thresholds and establish rewards schedules based on points scored by users—the number of advertising tokens collected over a specified time period.

In various embodiments, if users neglect or miss an opportunity to collect an active displayed advertising token as it appears, and before it disappears, it might contain the one last item needed for the user to complete an assigned sponsor's space on the user's collection cube. e.g., as a result, users may have to wait a considerable amount of time before their badly needed advertising token to randomly re-appear again.

In various embodiments, line of sight (LOS) tracking methods can be leveraged by this system such that it can be used to entice, then influence a user's focus to shift from one point in the viewable area to any other point that they might not have otherwise focused on during normal gameplay. e.g., when LOS is used in conjunction with ray tracing technologies, this method will at times, cause users to look where they might not otherwise look. The systems artificial intelligence learning machine mechanism component will track real-time viewed impression time to increase advertisement impressions in low threshold screen sections that can then be billed back to advertisers and sponsors while offering users more opportunities to interact with and collect additional sponsors advertising tokens.

In various embodiments, programmed audio cues are leveraged to maximize impressions and user focus. For this technology, sound cues will alert and familiarize users of a pending collection event. e.g., network broadcast sporting events demonstrate audio cues better than most productions: at the end of a series of plays, when the broadcast focuses on the announcers, a musical melody often begins to play subtly in the background. For the mass viewing audience this has become an effective, almost subliminal trigger for them to get ready to run to the fridge, or order on the phone to buy and use the sponsors products being presented, all before play resumes. In reality the audio cue system was initiated to signal to stations downline in the network to stand by and begin inserting local advertising messages into the televised broadcast event.

In various embodiments, future applications will enable Smart Television systems, and yet to be developed audio visual systems and device systems to use the technology to enhance network and cable broadcast television in the same way as it does for streamlined internet broadcasts. e.g., as many network programs, such as CNN news broadcasting or pro sports events depict message boards, the technology described herein serves to turns those message boards in to interactive menus full of choices and opportunities to get more programming info and game stats, and also to collect additional sponsors advertising tokens while users watch a live and/or recorded, on demand and the like program event.

Turning now to the figures, FIG. 1 is a flow diagram illustrating a routine 100 that the technology may invoke in various embodiments, e.g., to register users for access to the network (e.g., inputs) observe inputs of selected users and award scores. (e.g., inputs). The routine 100 begins at block 102. The routine then continues at block 104, where it receives an input signal indicating the registration on the network of a user. e.g., the routine may receive input from various devices being used by the user. e.g., personal information being uploaded by the user for future network identification. The routine then continues at block 106, where it receives a command signal from a user using an electronic device, e.g., executing at a video console. e.g., the routine may receive inputs from a user's keyboard and or mouse mechanism that the user employs. The routine then continues at block 108, where it assigns specific advertising tokens impression signals related to the user's registration input. The routine then continues at block 110, where it activates the advertising token generator based on user input information provided during sign-up. The routine then continues at block 112, where it receives a specification of view from the graphic user interface. The routine then continues at block 114, where it attributes an advertising value based on the specified view. The routine then continues at block 116, where it forwards input signals from the graphic user interface to the advertising depository and returns. The routine then continues on at block 120 where it calculates advertising token values. The routine repats at block 120 to select subsequent registered users to begin the routine again. The routine stops at block 124.

Those skilled in the art will appreciate that the logic illustrated in FIG. 1 and described above, and in each of the flow diagrams discussed below, may be altered in a variety of ways. For example, the order of the logic may be rearranged, sub logic may be performed in parallel, illustrated logic may be omitted, other logic may be included, etc. In various embodiments, portions of the routine may be executed by a server computing device, a client computing device, or other computing devices.

Figure 2:
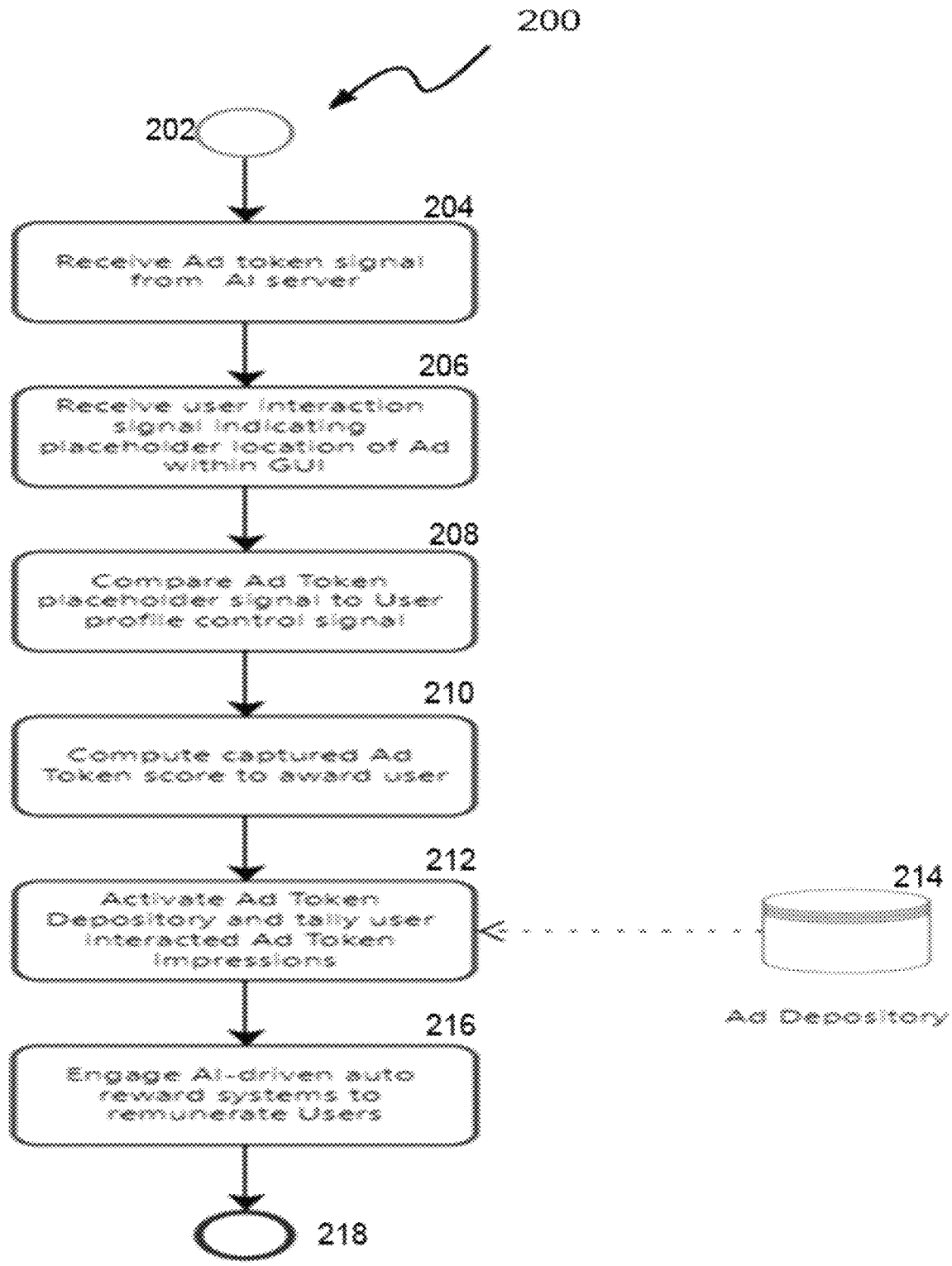
FIG. 2 depicts a Flow chart diagram that shows the user/gamer interface.

FIG. 2 is a flow diagram illustrating a routine 200 that the technology may invoke in various embodiments, e.g., the environment 200 can receive advertising signals from the artificial intelligence machine learning component server at block 204 (e.g., an advertisement as supplied by a contracted advertiser/sponsor), and receive user interaction signal at block 206 (e.g., create placeholder location of advertisements within the graphic user interface, and the like.) and at block 208 compare advertising token to users profile (e.g., assign appropriate advertisement to users graphical user interface.) The artificial intelligence machine learning component server awards a score to the user at block 210. (e.g., the users interact with an advertising token during an online experience.) At block 212 the system activates the advertising token depository 214 to tally advertising tokens scores for interacted impressions. (e.g., when a user clicks on, hovers over, shoots down, and the like, an interactive advertising token.) The artificial intelligence machine learning component server activates at block 216 to award the related prize to the user. The routine ends at 218 resetting for the next user, and at the users input request can continue on at routine 300.

Figure 3:
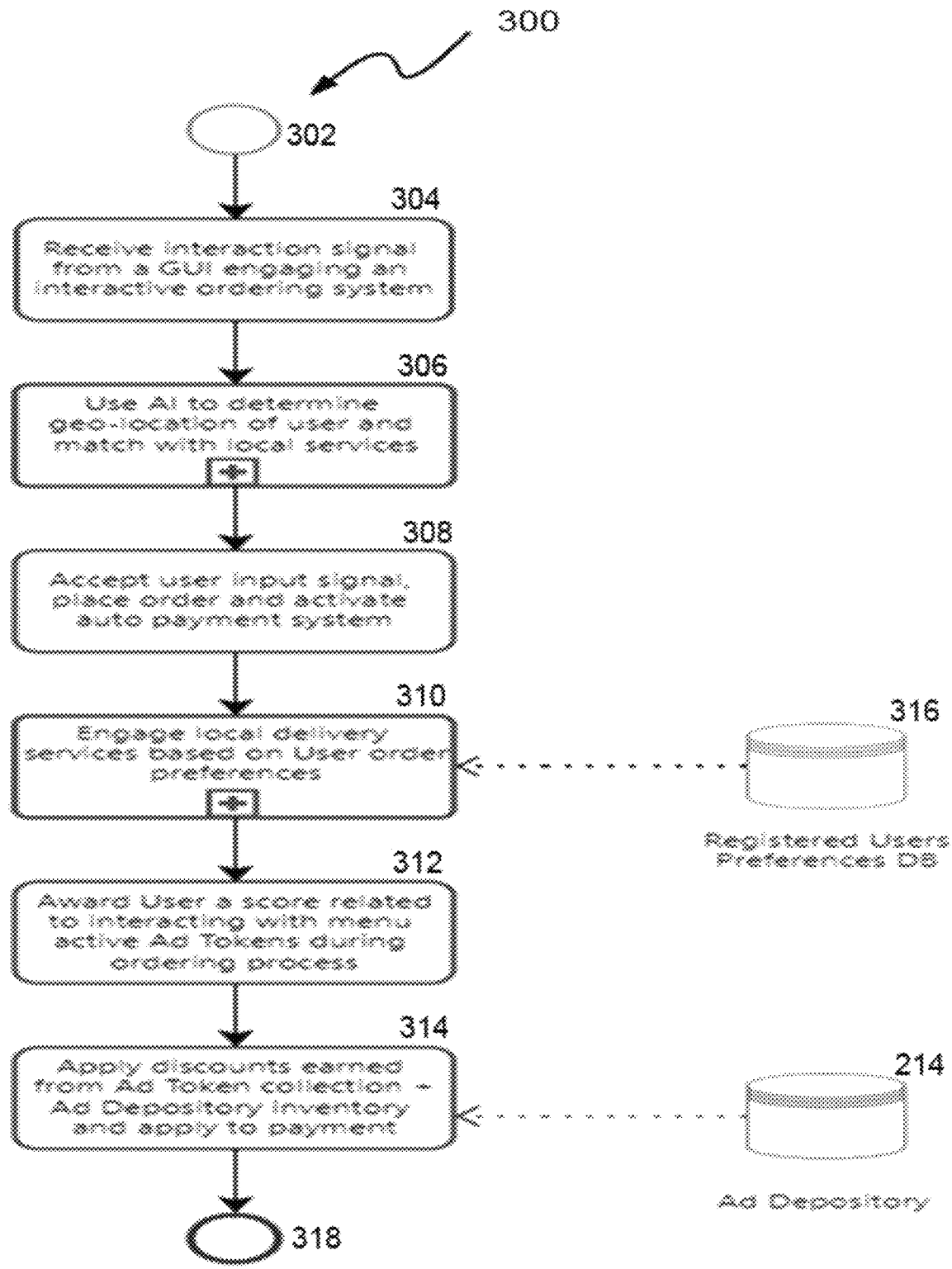
FIG. 3 depicts a Flow chart diagram that shows the automated Ordering & Delivery system interface.

FIG. 3 is a flow diagram illustrating a routine 300 that the technology may invoke in various embodiments, e.g., the actions of 300 start at block 302 and can receive a network signal at block 304, (e.g., the Internet or an intranet, that receives a signal from an interactive ordering system), then uses the artificial intelligence machine learning component server at block 308 to accept a user input signal to place an order and activate the payment system. (e.g., a user clicks on an interactive food menu to order a pizza to be delivered and the payment to be automatically debited from an online account.) At block 310 the system engages the delivery system from inputs of the registered user's database at block 318. (e.g., a user orders online and the system uses the registration information from block 318 to assign a delivery location address to the food ordered.) At block 312 the artificial intelligence machine learning component server awards the user a score for interacting with a menu during the ordering process. (e.g., the user clicks on a menu item from a sponsor and as the order is prepared points are awarded to the user for interacting with a sponsor's advertising token.) The artificial intelligence machine learning component server at block 314 applies available discounts or saved coupons as debited from the Advertising Depository at block 214. The system stops the routine at block 318 readying to reset the routine for the next user interface routine.

Figure 4:
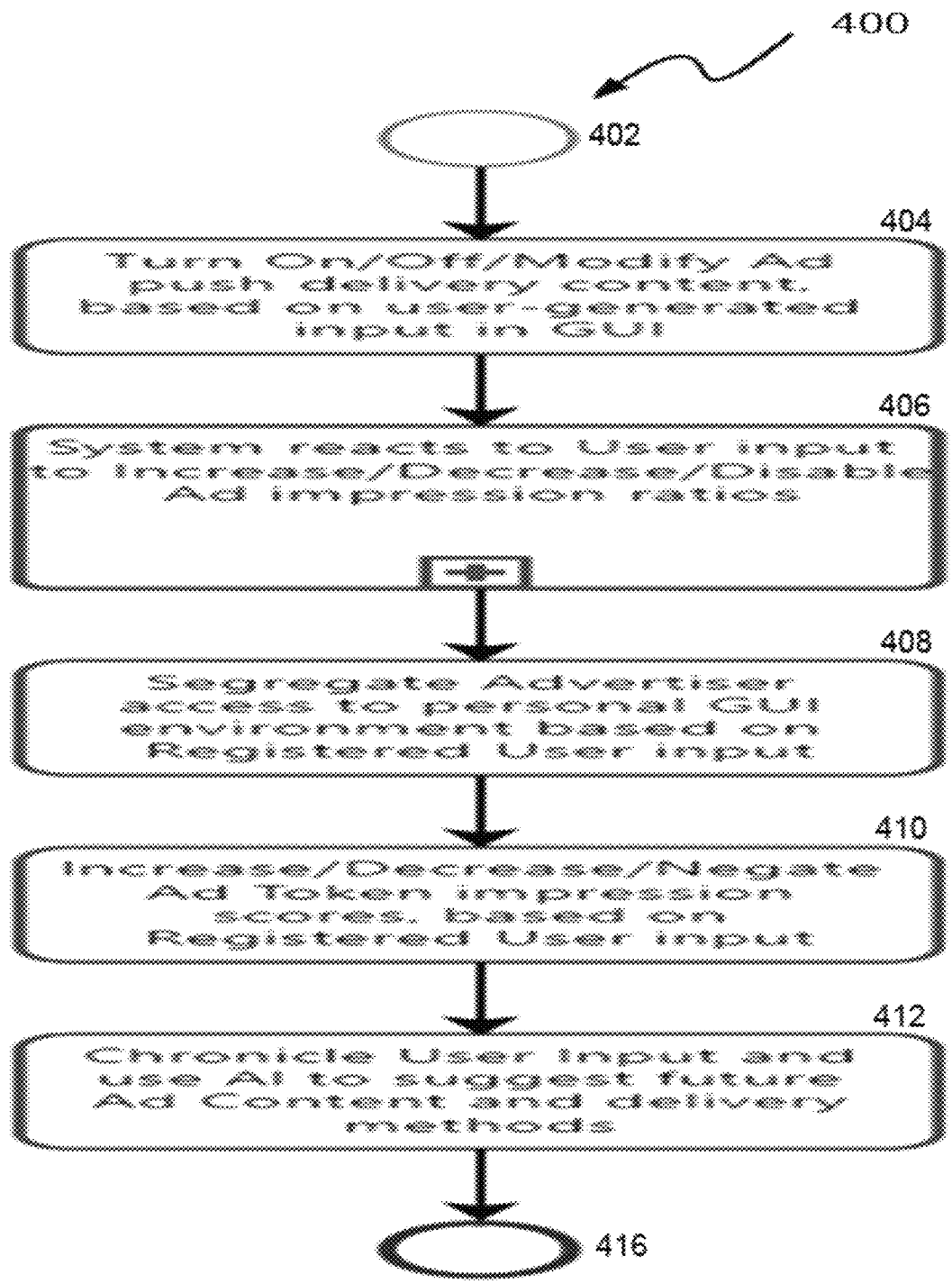
FIG. 4 depicts a Flow chart diagram that shows the Advertising Content Delivery system user interface.

FIG. 4 is a flow diagram illustrating a routine 400 that the technology may invoke in various embodiments. The routine 400 begins at block 402, e.g., (e.g., the artificial intelligence machine learning component server turns off and on while it modifies advertisement push delivery content to a specified user.) The routine then continues at block 404 as the system reacts to user input to increase or decrease or disable user specified advertising impressions. The system at block 408 then segregates sponsors/advertisers access to a specified user's personal graphical user interrace as generated for the user by the artificial intelligence machine learning component server. (e.g., the routine may receive input from various user inputs to draw conclusions from.) The routine then continues at block 410, where it receives a control signal from a user to increase or decrease or negate further advertising token impressions, (e.g., the user wants more or less, or no advertisement content pushed to them at this time.) The routine then continues at block 412, where the artificial intelligence machine learning component server chronicles user input and provides feedback to the user so that the user may adjust the advertisement input threshold from the artificial intelligence machine learning component server. The routine then continues at block 416, where it returns and is passively active awaiting the next user input.

Those skilled in the art will appreciate that the logic illustrated in FIG. 4 and described above, and in each of the flow diagrams discussed, as they may be altered in a variety of ways. For example, the order of the logic may be rearranged, sub logic may be performed in parallel, illustrated logic may be omitted, other logic may be included, etc. In various embodiments, portions of the routine may be executed by a server computing device, a client computing device, or other computing devices.

Figure 5:
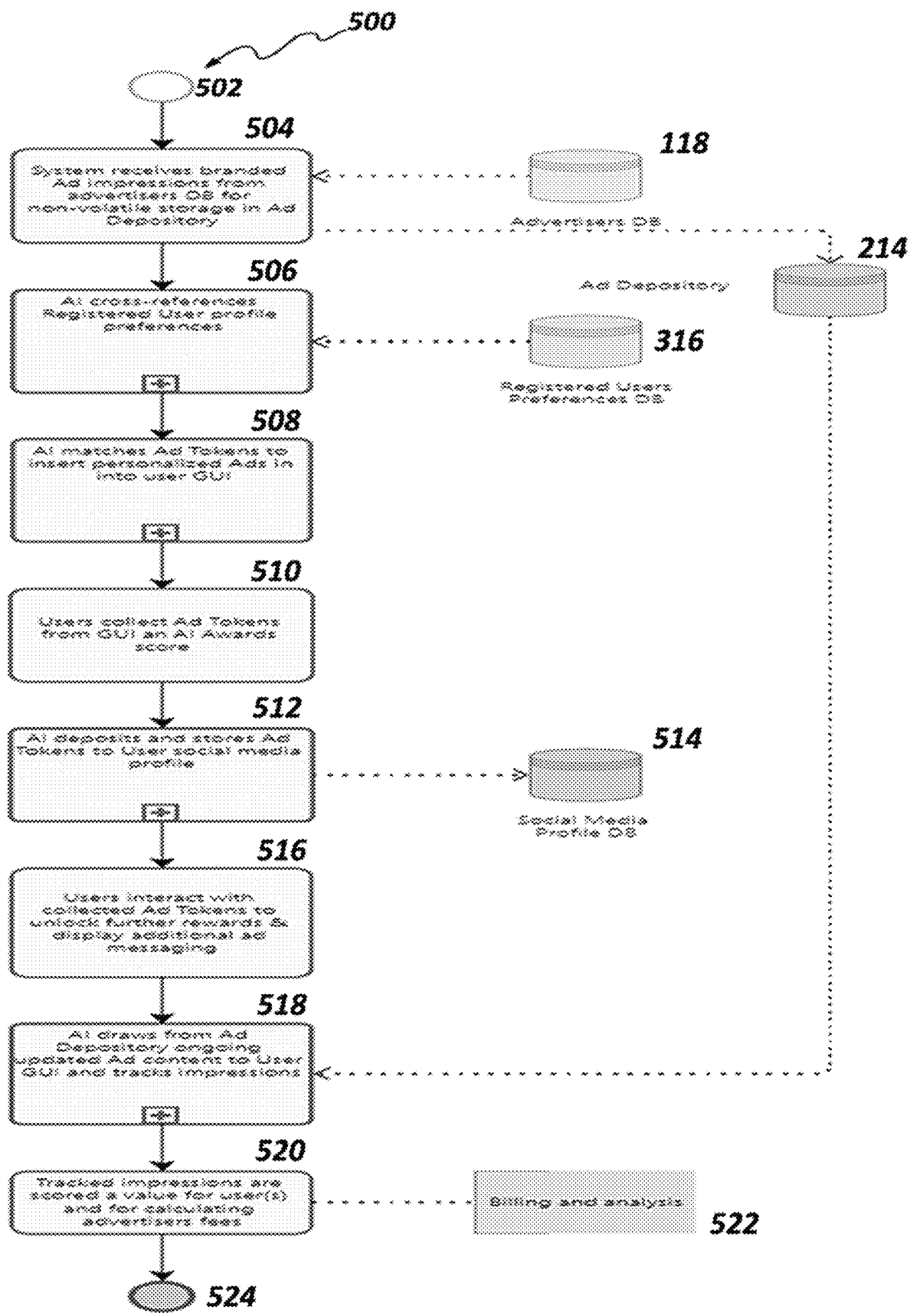
FIG. 5 depicts a Flow chart diagram that shows the Advertising Content Depository.

FIG. 5 is a flow diagram illustrating a routine 500 that the technology may invoke in various embodiments, (e.g., to receive branded advertisement impressions at block 504 from block 118 for non-volatile storage in block 214. The routine continues on at block 506 where the artificial intelligence machine learning component server references the registered users profile preferences then continues on at block 508 where the artificial intelligence machine learning component server now matches advertising tokens for insert in content viewed in the user's graphic user interface. At block 510 users interact with and collect advertising tokens and a score is awarded to the user by the artificial intelligence machine learning component server. At block 512 the artificial intelligence machine learning component server stores a users collected advertising tokens in the user's social media network location at block 514. The routine 500 continues on at block 516 where the user interacts with their collected advertising tokens to unlock additional rewards by further interacting with a contracted sponsors/advertisers messaging. Continuing routine 500 at block 518 the artificial intelligence machine learning component server draws advertisements from block 214 and randomly interjects these advertisements into a user's content. Routine 500 continues at block 520 where user interacted impressions are tracked by the artificial intelligence machine learning component server and having been previously assigned a monetary value at block 522 where each impression is analysed then
assigned a score that represents this monetary value which is calculated for each impression for reasons of accounting and billing for paying out sponsors, advertisers, prize pools, other related business fees, and the like. The routine 500 ends at block 524 where it re-sets for additional user input from the artificial intelligence machine learning component server and continues on with the next routine.

Those skilled in the art will realize that all of the listed routines can and will happen in many different orders and sequences than that which is presented in these FIGS. 1 to 7 and is wholly dependent upon user input and an evolving artificial intelligence machine learning component.

Figure 6:
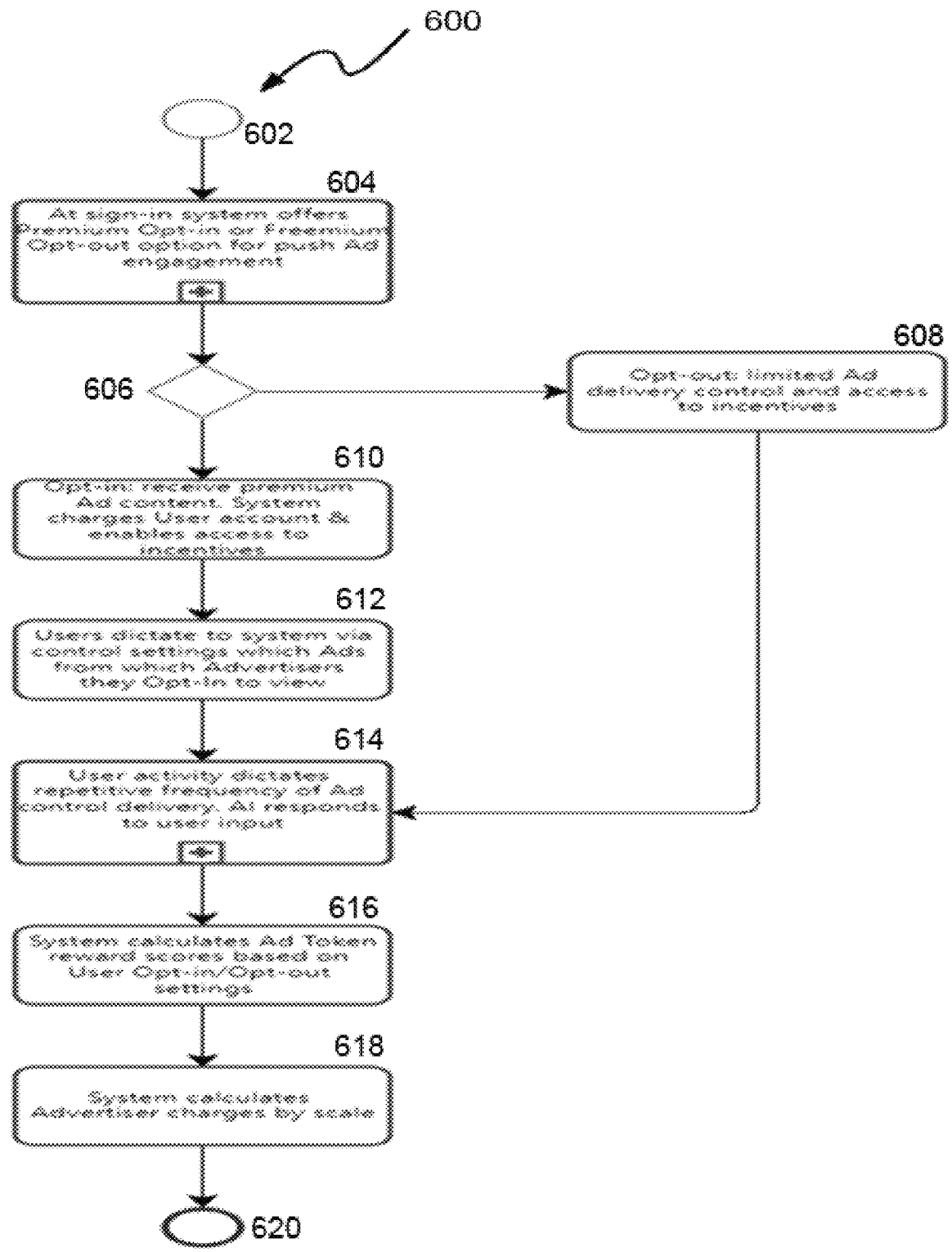
FIG. 6 depicts a Flow chart diagram that shows the Opt-in Premium or Opt-out Freemium options.

FIG. 6 is a flow diagram illustrating a routine 600 that begins at block 602 with a user registering to access the network. (e.g., To comply with evolving privacy acts the system allows the user a choice during their sign-up procedure.) the routine at block 600 continues at block 606 but the user has the option to opt out at block 608 or continue onto block 610 and choose the systems opt-in function. At block 608 the user has opted out of advertising and has limited the control and delivery of advertisement content. Choosing the path of block 608 the user also limits themselves to awards and incentives. When the user chooses the path of block 610 they have given the network system their permission to use their personal data as accumulated by the artificial intelligence machine learning component. This permission or "Opt-in to Cash in" function enables the user of the path of block 610 to qualify for all prizes and rewards offered by the network and the sponsors and advertisers who are contracted to the network. The user of the path at block 610 moves through block 612 where the user dictates to the system which specific advertisements and from which sponsors or advertisers they choose to have advertisements pushed to their content. At block 614 users of the path of blocks 608 and 610 now converge at block 614 where their user activity dictates the frequency of advertisements delivered to their content. Users of the path of block 608 (Opt-out) and block 610 (Opt-in) proceed to block 616 where the artificial intelligence machine learning component calculates the interactive impressions and rewards advertising token scores based on whether the user from the path of block 608 or the path of block 610 has opted-in to accept the networks free use of their personal; data collected while they are signed into the network, or they have opted-out to not accept the use of their personal information for network purposes thus restricting their eligibility to be assigned major rewards such as cash, trips, autos, and the like. The routine of 600 continues on at block 618 where the artificial intelligence machine learning component calculates advertisement impressions from both the users of the paths of block 608 and 610 and debits the network contracted advertiser or a sponsor on the agreed payment scale and schedule. The routine 600 ends at block 620 and resets itself for the next user interaction.

Figure 7:
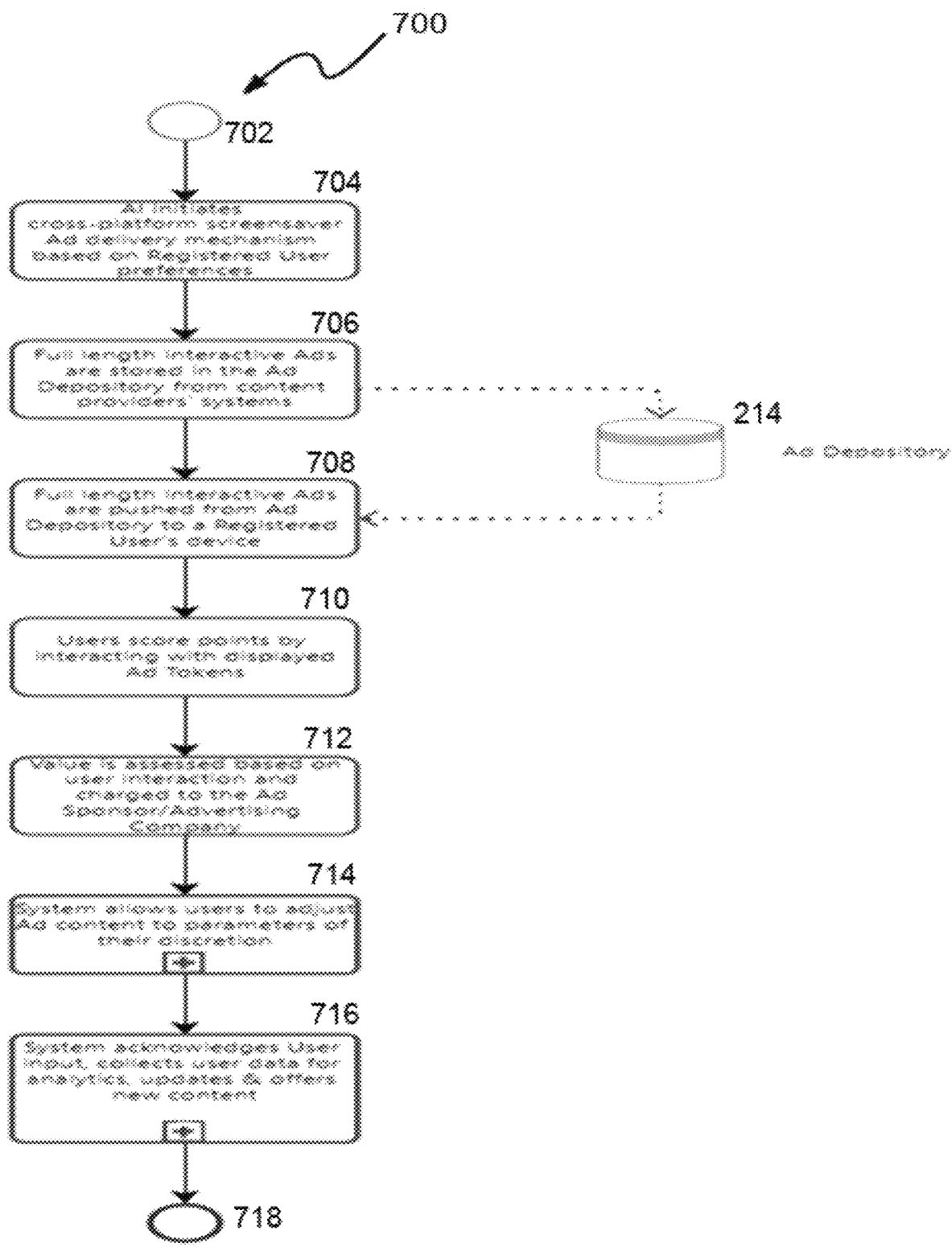
FIG. 7 depicts a Flow chart diagram that shows the Interactive Screensaver Advertising Content delivery system.

FIG. 7 is a flow diagram illustrating a routine 700 where the user of the technology starts at block 702 and may invoke the system to cause the artificial social intelligence machine learning component to engage at block 704 to display the cross-platform screensaver advertisement delivery mechanism based on registered user preferences. Following through at block 706 a network contracted advertiser and sponsors full length interactive advertisements and related information both static and dynamic presentations are stored in the advertisement depository at block 214. At block 708 full length interactive advertisements and related information both static and dynamic presentations from contracted network sponsors and advertisers are pushed to the user's device to appear in the form of a traditional style screen saver mechanism. At block 710 users are encouraged to interact with the traditional style screen saver mechanism to order products and services and schedule future ordering and delivery date and time options, to score additional points and collect advertising tokens for future redemption purposes. Following through to block 712 a monetary value is assessed two each advertisement impression as the user interacts with the traditional style screen saver mechanism and the calculated value for each impression is charged to the advertising or sponsoring company. Continuing on to block 714 the artificial intelligence machine learning component allows users to adjust content push delivery. At block 716 the artificial intelligence machine learning component acknowledges user input to collect user data from block 610 opt-in users for analytics, updating user profiles and preferences, and to offer new content and available awards to block 610 opt-in users. The routine 700 stops at block 718 to reset itself for the next registered user.

From the preceding and the foregoing, it will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the claims.

I claim:

1. A method performed by a computing system having a processor and memory, the method for interactive advertising and real-time gamification of brand icon recognition in video engagements using artificial intelligence machine learning (A.I.M.L.) algorithms, the method comprising;
    the processor utilizing the A.I.M.L. algorithms to perform operations comprising:
    real-time content analysis and random masking of branded icons, items, and objects within various live or recorded video engagement platforms;
    managing user interactions with time sensitive-self deleting brand icon tokens;
    controlling an interactive screensaver's functions and ad content based on user preferences and content analysis;
    intercepting content streams between servers and registered network end-users, performing real-time content analysis, masking, and highlighting of time sensitive-self deleting branded objects within video content;
    intercepting content streams between servers and registered network end-users, performing real-time content analysis, determine no recognisable brand icons exist in the video content, choosing to insert interactive content as per each users instructions;
    introducing a gaming aspect by creating a time-sensitive collection of masked brand icons and offering rewards or incentives based on registered user interactions;
    incorporating sound triggers to initiate input signals and further, to alert users to pending input signals to an upcoming real-time scoring opportunity, and interactive advertisement displays within various content forms;
    enabling user control over brand icon recognition content through social media-style accounts, a user control interface, and a control panel-style interface to adjust advertisement content, frequency, and delivery methods and integration with rewards and payment systems;
    providing an A.I.M.L.-driven ordering, delivery, and payment system, a 3D brand icon depository, automated interactive screensaver advertisements;
    restricting user access to the brand icon depository during active viewing, enabling access post-engagement;
    integrating an audio and video recording and playback mechanisms within electronic games, music videos, movies, search engines, and relevant online data;
    linking a registered user interface to an A.I.M.L.-driven automated ordering, delivery, and payment system with an interactive menu for products and services, integrating collectable brand icon tokens;
    actuating a 3D omni-directional rotating brand icon depository simulator to act as a multi-functional gaming mechanism and computing scores based on collection thresholds, launching an automated rewards system, and integrating direct active links to advertisers' online content;
    offering users various input methods to block brand icon delivery and associated advertisers based on personal preferences;
    inserting micro-brand icons into parent brand icons using A.I.M.L. to control micro-brand icon placements according to user preferences;
    implementing a proprietary interactive gamified cryptocurrency, similar to Bitcoin, that assigns monetary value and interactive functions to collected brand icons (ad tokens), allowing users to share, swap, trade, sell, donate, or give away collected brand icon ad tokens.

\* \* \* \* \*